United States Patent

Bluemel et al.

[11] Patent Number: 6,005,786
[45] Date of Patent: Dec. 21, 1999

[54] CIRCUIT FOR AN ALTERNATOR OF A MOTOR VEHICLE AND METHOD FOR CONTROLLING THE CIRCUIT

[75] Inventors: Roland Bluemel, Plieningen; Anton Heni, Kernen; Hermann Bosch, Amstetten; Markus Krauss, Waeschenbeuren, all of Germany

[73] Assignee: DaimlerChrysler AG, Stuttgart, Germany

[21] Appl. No.: 09/127,827

[22] Filed: Aug. 3, 1998

[30] Foreign Application Priority Data

Aug. 1, 1997 [DE] Germany .............. 197 33 208

[51] Int. Cl.⁶ .............. H02M 7/00; H02M 5/42
[52] U.S. Cl. .............. 363/70; 363/69; 363/89; 307/71
[58] Field of Search .............. 363/70, 69, 68, 363/89; 322/29, 89, 90; 307/71

[56] References Cited

U.S. PATENT DOCUMENTS

| | | |
|---|---|---|
| 3,984,750 | 10/1976 | Pfeffer et al. . |
| 4,045,718 | 8/1977 | Gray . |
| 4,456,870 | 6/1984 | Rodari et al. . |

FOREIGN PATENT DOCUMENTS

| | | |
|---|---|---|
| 0 446 184 | 9/1991 | European Pat. Off. . |
| 23 52 227 | 4/1975 | Germany . |
| 23 27 602 | 10/1991 | Germany . |
| 1312699 | 4/1973 | United Kingdom . |
| WO 92/07406 | 4/1992 | WIPO . |

*Primary Examiner*—Peter S. Wong
*Assistant Examiner*—Rajnikant B. Patel
*Attorney, Agent, or Firm*—Evenson, McKeown, Edwards & Lenahan, PLLC

[57] ABSTRACT

A circuit is provided for an alternator of a motor vehicle with the winding of the alternator consisting of two half-windings, with rectification of the voltages and currents at the outputs of the two half-windings taking place, with the outputs of one half-winding being connected with the inputs of a first rectifier, and with the outputs of the other half-winding being connected with the inputs of another rectifier, and with each output of one half-winding being connectable across the gaps of two switchable elements with two outputs of the other half-winding in each case such that when the gaps are bridged, the two half-windings are connected electrically in series. In a method for triggering the switchable elements, the individual thyristors are triggered in succession and/or only individual transistors are triggered, with this preferably taking place when a certain motor rpm is undershot. Diodes c an also be used instead of individual thyristors.

18 Claims, 7 Drawing Sheets

CIRCUIT FOR AN ALTERNATOR OF A MOTOR VEHICLE AND METHOD FOR CONTROLLING THE CIRCUIT

BACKGROUND AND SUMMARY OF THE INVENTION

This application claims the priority of German Application No. 197 33 208.0, filed Aug. 1, 1997, the disclosure of which is expressly incorporated by reference herein.

The present invention relates to a circuit for an alternator (generator) of a motor vehicle and a method for controlling the circuit.

A circuit of this kind is already known from German Patent document DE 32 27 602 C2 (see FIG. 3 thereof) in which the alternator of a motor vehicle is divided into two half-windings. The outputs of each half-winding are each connected with the inputs of a rectifier. Each of the outputs of one half-winding is connected with an output of the other half-winding though a switchable element. The switchable element in each case is a thyristor triggered as a function of the engine rpm. When the engine rpm of the motor vehicle drops below a certain value, the thyristors are triggered to connect the two half-windings electrically in series. Above this rpm, the two half-windings are connected electrically in parallel.

A similar circuit is also known from German Patent document DE 23 52 227 A1 according to which, as a function of the engine rpm, a winding of one half-winding is switchable into a series connection with a winding of the other half-winding. Here again switching takes place as a function of engine rpm, with central control being performed by a relay so that either a complete 5 series connection or a complete parallel connection results. The two half-windings are wound in the same direction and have the same terminal connections.

This is intended to take into account the fact that the engine rpm of the motor vehicle, and hence the rpm of the alternator and consequently the power generated in the alternator, changes abruptly during operation. In order to provide sufficient electrical power even in urban stop-and-go traffic without imposing a load on the battery, the alternator must therefore be designed to generate sufficient power even when the engine is idling.

However, if the alternator is designed to have a lower cut-in rpm, power output is limited at higher rpm values. Conversely, if the alternator is designed for maximum power output, this requires a higher cut-in rpm. Hence, a compromise between these two criteria must be found. The conditions are shown for example in FIG. 2 of German Patent document DE 32 27 602 C2 in which the characteristic of the alternator power is plotted as a function of rpm. It is clear that the alternator has a so-called cut-in rpm above which it begins generating power. In order to generate sufficient electrical power during idle as well, it is necessary to lower this cut-in rpm point as far as possible. At higher rpm values, there is then a corresponding theoretical power surplus which is not useful, however. In a motor vehicle, the voltage at the terminals is not random but set to an on-board voltage of 14 V. The alternator then delivers a power of 6 kW at 6000 rpm for example, but only 2 kW can be obtained from it. Therefore, an unnecessarily large amount of iron must be carried around in the alternator, thus making the alternator over sized.

While the two hale-windings and/or the individual windings of the half-windings are each connected pairwise in series at low engine rpm values, the output voltage of the alternator is increased at low engine rpm values. The alternator can therefore be designed so that for the same cut-in rpm and power $P_{el}$ the extreme rpm range from approximately 2000 rpm to 18,000 rpm is limited to the range from 1000 rpm to 9000 rpm. This produces considerable improvements in the efficiency of up to 15%, especially in the upper rpm range. Further, the alternator noise is reduced.

Other solutions to this problem are based on a so-called "step-up" or star-delta switching. The step-up is connected at low rpm values for the engine and increases the rpm of the alternator by a factor of 2 once again. At this transmission ratio (V-belt 1:2 or 1:2.7+step-up 1:1.7=1:4.59), the alternator rpm is high enough even at idle to provide sufficient power. With star-delta switching, at low rpm values the alternator is star-connected since the alternator voltage is then larger by a factor of 13 than with a delta connection. The alternator therefore delivers the power even at lower rpm levels. At higher rpm levels it switches back to the delta connection so as not to have any adverse effect on the power.

The goal of the present invention is to provide a circuit for an alternator or generator for a motor vehicle as well as a method for controlling an alternator or generator so that the alternator or generator supplies sufficient power even at low rpm and the output power of the alternator or generator is not limited at higher rpm levels in order to meet the power requirement. The terms alternator and generator can be used interchangeability herein. According to the invention, this goal is achieved firstly by a circuit in which, in contrast to the abovementioned prior art, each output of one half-winding can be connected across the gaps of two switchable elements with two outputs of the other half-winding in such fashion that when the gaps are bridged, the two half-windings are connected electrically in series. Therefore a star, delta, or zigzag winding can be used for the two half-windings.

It turns out that -he losses in the switchable elements can be minimized during operation at low rpm values. This can be demonstrated, for example, if the switchable elements are formed by thyristors as described in the circuit according to the invention. Losses are also minimized if the switchable elements are designed as MOS components.

In another preferred embodiment according to the invention, at least one output of one half-winding is connectable across the gap or gaps of at least one switchable element with a number of outputs of the other half-winding that corresponds to the number of switchable elements in such fashion that when the gaps are bridged, individual windings of the two half-windings are connected electrically in series.

Therefore, certain windings remain connected in parallel in all cases. In this embodiment, parts can be saved. At low rpm values, this circuit offers only a slighter power by comparison with the circuit according to the first embodiment, but can be sufficient under certain conditions that depend on the loads to be supplied with power. This circuit also halves the cut-in rpm.

In another preferred embodiment according to the invention, at least one output of one half-winding is connected by through at least one diode with a number of outputs of the other half-winding that is equal to the number of diodes in such fashion that individual windings of the two half-windings are connected permanently electrically in series.

In contrast to the prior art, in this case the individual windings are permanently connected electrically in series without the series circuit being switchable to a parallel circuit. In this circuit, the switching is considerably simplified to the point where no triggering of switchable elements is required.

This circuit produces a characteristic in which the power provided by the alternator at higher rpm values is limited relative to the circuit according to the first embodiment. Depending on the electrical loads (consumers) to be supplied, however, this reduced power can be sufficient. When the power that is made available on the basis of the characteristic curve is sufficient even at lower rpm values, a circuit can be produced in which no control over the switchable elements is required. The switching expense (cost) can then be completely simplified (reduced overall), and in this case the cut-in rpm of the alternator is also cut in half.

In a preferred advantageous circuit according to the invention, at least one additional output of one half-winding is connectable across the gap or gaps of at least one switchable element with a number of outputs on the other half-winding that corresponds to the number of switchable elements in such fashion that when the gaps are bridged, individual windings of the two half-windings are connected electrically in series.

Advantageously this results in a combination of windings of the two half-windings that are permanently connected (via the diodes) in series with other windings that are connected in series by means of the switchable elements when the switchable elements are triggered, and are otherwise connected in parallel.

According to the invention, a method for controlling the circuit for the alternator triggers the switchable elements simultaneously when the engine rpm of the vehicle drops below a certain value.

As a result, a switch is made from the characteristic curve of the parallel circuit to the characteristic curve of the series circuit. The alternator can then be operated at any rpm in accordance with these two switch states to supply a power that comes quite close to the theoretical alternator power that can be achieved. This theoretically achievable alternator power can be described as follows:

$$P_{theo} = C_{Esson} * D^2 * li * n_{sy}.$$

The individual values are the Esson coefficient $C_{Esson}$, the bore diameter D, the ideal laminated core length li, and the synchronous rpm $n_{sy}$.

In a preferred method according to the invention, the switchable elements are triggered sequentially and/or only individual switchable elements are triggered.

As a result, a kink in the power characteristic curve during the switching process can be advantageously avoided. Since the thyristors are triggered sequentially, there is a gentler transition. Therefore, there are no oscillatory excitations of the V-belt that could take the form of mechanical stress.

In a further preferred method according to the invention, the switchable elements are triggered when the engine rpm of the vehicle drops below a certain value.

Advantageously, at higher rpm values the two half-windings are operated in parallel, while a transition to a series connection is gradually performed during the transition to lower rpm values.

Other objects, advantages and novel features of the present invention will become apparent from the following detailed description of the invention when considered in conjunction with the accompanying drawings.

DETAILED DESCRIPTION OF THE DRAWINGS

Figure 1:
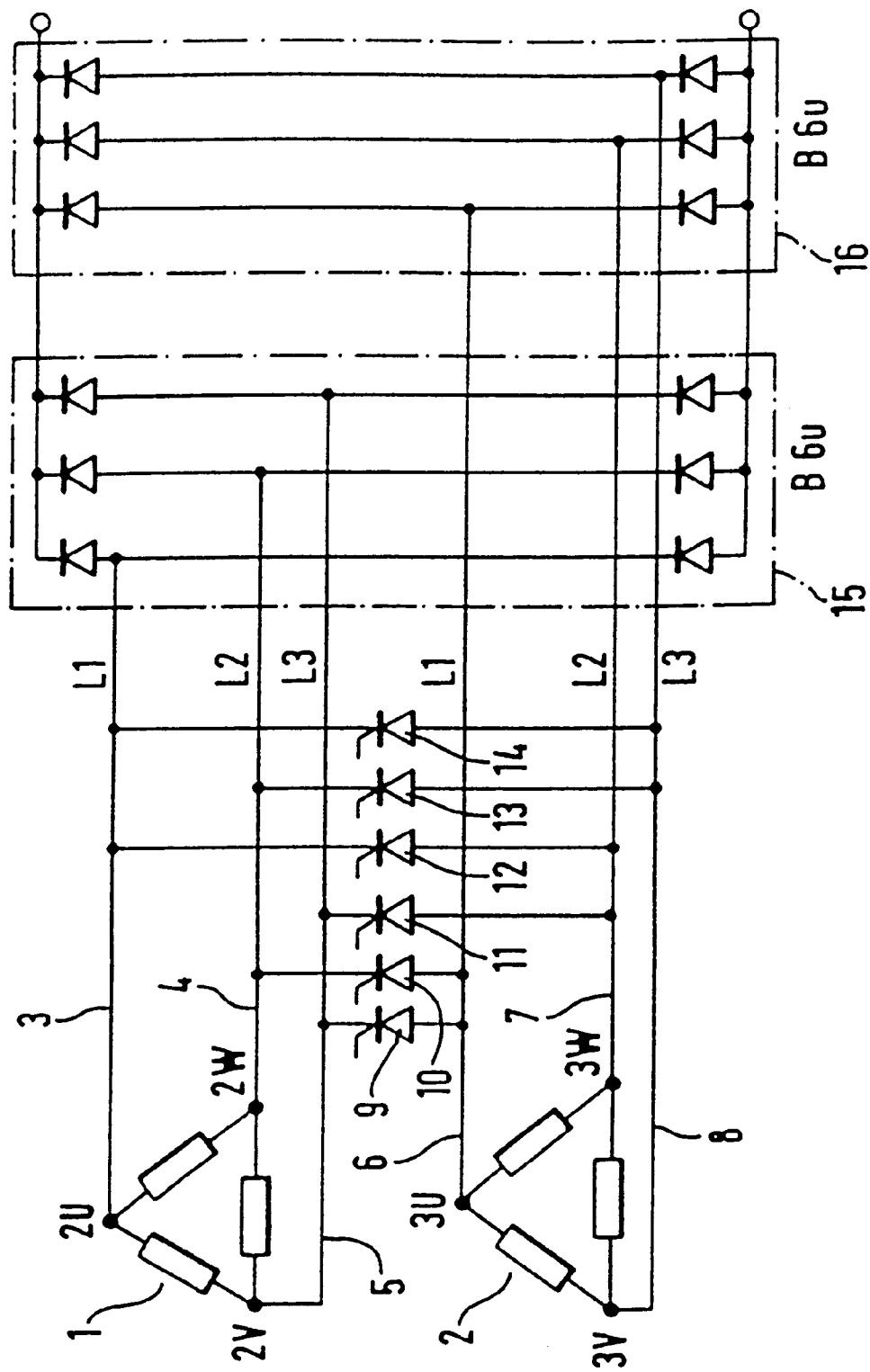
FIG. 1 is a circuit of an alternator of a motor vehicle according to the invention.

FIG. 1 shows a circuit for an alternator (generator) of a motor vehicle. The winding of the alternator consists of two half-windings 1 and 2. From each of these two half-windings 1 and 2, three connecting leads extend to the inputs of a bridge rectifier. From half-winding 1 the three connecting leads 3, 4, and 5 extend to the inputs of bridge rectifier 15 and from half-winding 2 the three connecting leads 6, 7, and 8 extend to the inputs of bridge rectifier 16. The two half-windings are identical and rotate in the same direction, and also have the same terminal connections as can be seen from the terminal labels in FIG. 1. It makes no difference in this regard whether the two three-phase systems are connected in a star, delta, or zigzag circuit.

Connecting leads 3, 4, 5 and 6, 7, 8 are connected by thyristors 9, 10, 11, 12, 13, and 14. The gaps of the thyristors connect the leads of the two half-windings in such fashion that connecting leads 5 and 6 are linked by thyristor 9, connecting leads 4 and 6 are linked by thyristor 10, connecting leads 5 and 7 are linked by thyristor 11, connecting leads 3 and 7 are linked by thyristor 12, connecting leads 4 and 8 are connected by thyristor 13, and connecting leads 3 and 8 are connected by thyristor 14.

The corresponding connecting leads are linked by the thyristors when the latter are triggered.

When the thyristors are not triggered because of the way in which the two bridge rectifiers 15 and 16 are wired, the two half-windings 1 and 2 are connected in parallel. When the thyristors are triggered, the two half-windings 1 and 2 are connected in series. The thyristors can be triggered without chronological synchronization. This is accomplished using continuous triggering pulses of a limited amplitude. Because of the relatively slow rise in the main current, no "steep pulses"+override are required. As a result, the transistor effect that can lead to the destruction of semiconductors poses no problems.

In the case of the series circuit, the three diodes (anode star) of bridge rectifer 15 that are at the bottom in the view shown in FIG. 1 as well as the three diodes (cathode star) of bridge rectifier 16 that are at the top in the view in FIG. 1 lose the current lead and quench completely.

In contrast to another arrangement known to the inventors in which bridge rectifiers are connected in series at their respective outputs, the arrangement according to the invention has the advantage that with the series connection, there are only two voltage drops at the diodes and one voltage drop at a thyristor because of the rectification by contrast with the voltage drops at the four diodes in a series circuit through the outputs of the bridge rectifier. As a result, in the circuit according to the invention, in the vicinity of the output voltages that are conventional in motor vehicles (14 V . . . 42 V) there is considerably better efficiency by contrast to the other circuit described.

By switching the thyristors in this way, a complete diode stage is eliminated. The special operation of the bridge rectifiers makes this possible by operation at the limit of double commutation.

Figure 2:
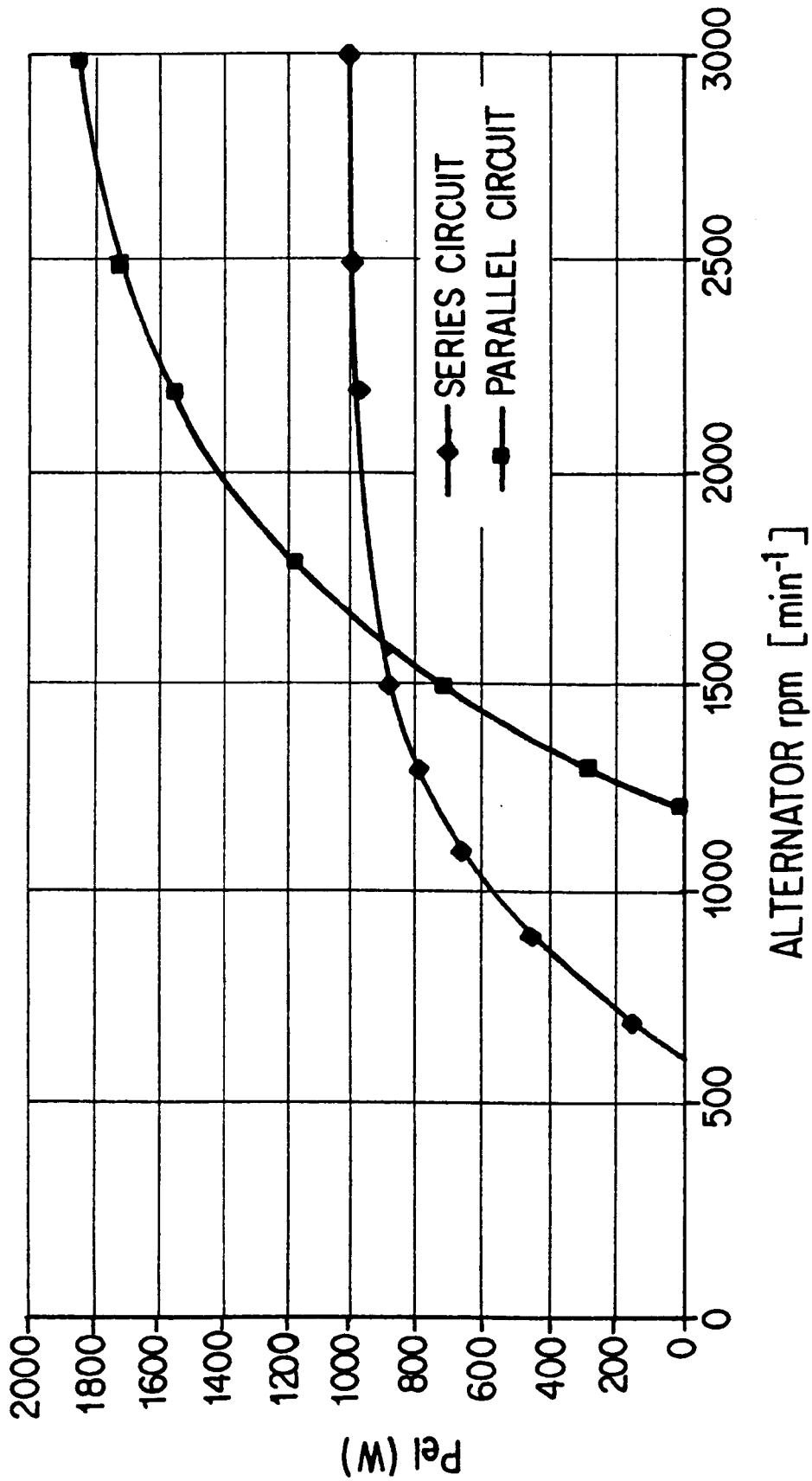
FIG. 2 is a graphical view of the output power of the alternator versus rpm.

FIG. 2 shows a view of the output power of the alternator versus engine rpm using a model built in the laboratory. The alternator is a Bosch model number NC73/143A. As an experimental condition, the terminal voltage was set at 14 V. In addition I–I$_{EN}$, in other words, this is a re-excited machine. The steady-state temperature θ was the steady-state temperature at an ambient temperature of 21° C.

It is evident that switching the windings results in a halving of the cut-in rpm in the series circuit (the thyristors are then triggered). The cut-in rpm is then approximately 650 rpm, which means 14 conductors per groove. When the thyristors are no longer being energized, the usual parallel circuit is established, which means 7 conductors per groove.

Hence, it is possible with the aid of six thyristors and joint triggering of these thyristors to produce two alternator characteristics. The rpm range of the alternator can be reduced significantly, in other words the overdimensioning of the alternator for the upper rpm range can be reduced or additional power can be obtained from the alternator without increasing the rotor volume. By means of permanent energization of individual thyristors, it is also possible to connect the phases of the individual windings partially in series and partially in parallel. A characteristic curve may be produced which delivers sufficient power at high rpm values and whose cut-in rpm is likewise satisfactory. The alternator could then be operated with such a circuit without the need for switching.

In contrast to the above-mentioned Bosch circuit according to the prior art, a reduction of the lost power is also achieved. In the prior art cited (German Patent document DE 32 27 602 C2) the actual DC current I$_d$ is conducted by a single thyristor during three of the total of 60° Pel intervals per period. Thus, the lost power is: P$_{VThy}$:

$$P_{VThy}=(U_{To}*I_d)+r_{diff}*I_d^2$$

Here U$_{To}$ is the diffusion voltage and r$_{diff}$ is the differential resistance. The current: I$_d$ is the current that flows from the output terminals of the rectifier to the battery and/or to the load (consumer) in the motor vehicle.

On the other hand, the thyristors in the circuit according to the embodiment show:n in FIG. 1 can be triggered in such fashion that two thyristors at a time always conduct the current, so that the current is reduced in a chronological average to I$_d$/2 during all 60° intervals. Thus the lost power is P$_{VThy}$:

$$P_{VThy}=((U_{To}*I_d/2)+r_{diff}*(I_d/2)^2)*2$$

The last factor two (2) results from the fact that two thyristors are always conducting current at any one time. By conversion we have:

$$P_{VThy}=U_{To}*I_d+2*r_{diff}*I_d^2/4=U_{To}*I_d+r_{diff}*I_d^2/2$$

Figure 3:
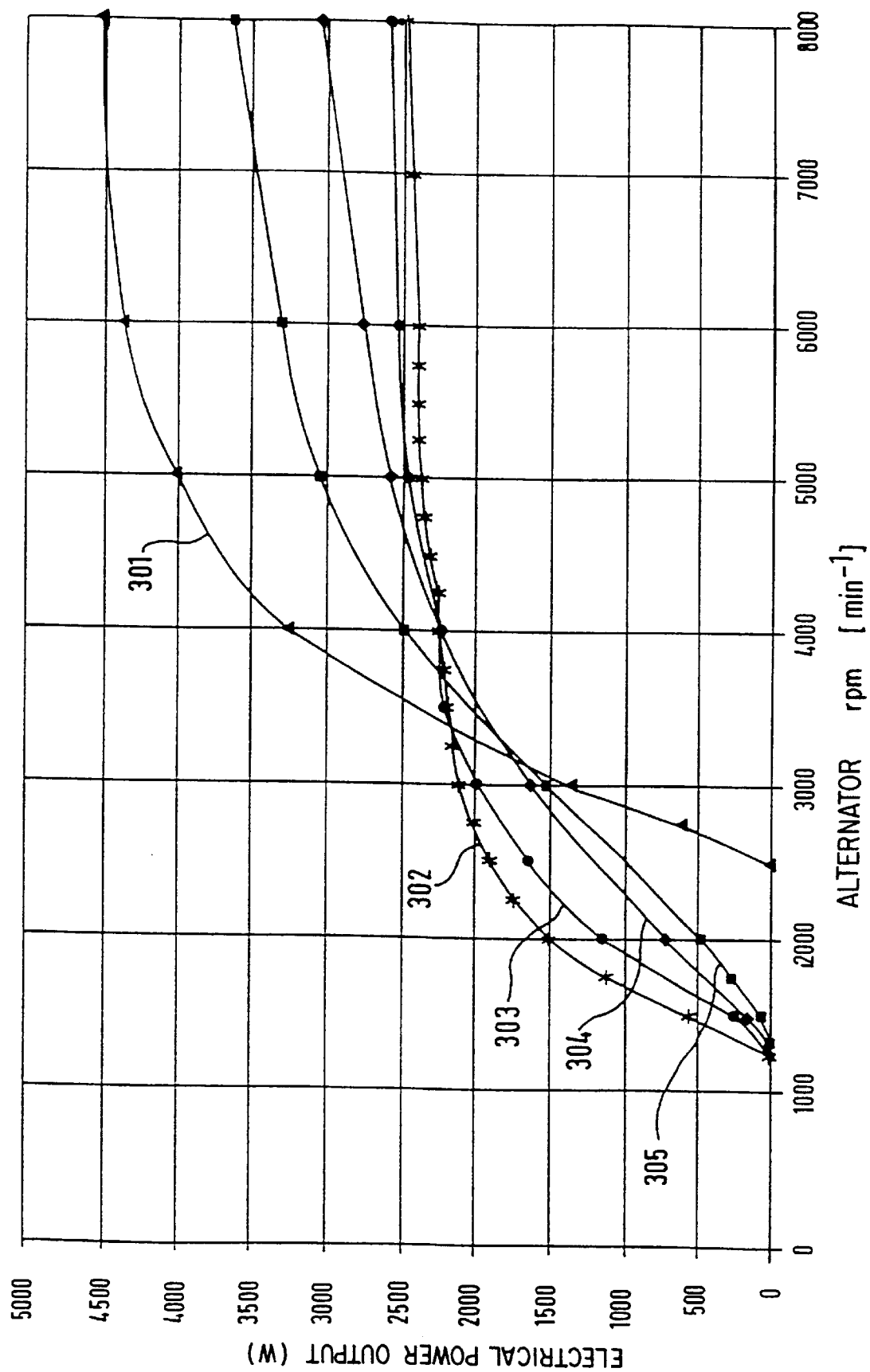
FIG. 3 show various characteristic curves when triggering various groups of thyristors in accordance with the invention.

Therefore, it is evident that reduction of the lost power takes place in the term that contains the differential resistance. This is important in conjunction with the present invention, since the greatest losses occur in thyristors with relatively high throughput voltages. Another advantage of the circuit is that in contrast to the prior art in which the diodes are in the form of press-fit diodes on the diode plate, they can be designed as a power module. In the module, the semiconductor chips are located on an Al$_2$O$_3$ or AlN (aluminum nitride) substrate in the immediate vicinity and are bonded accordingly to the circuit. The fact that they are in the immediate vicinity soon produces a heat emergency because a great deal of lost heat occurs in relatively narrow spaces. In the circuit according to the invention, the current is distributed over six thyristors. Hence, there is a large chip area and fewer losses occur. In addition, in the series circuit, one complete anode star and one cathode star are inactive. As a result of this redundancy, the lost heat is even developed in the power module at different locations, which is advantageous for dissipating the heat. The comment also made in German Patent document DE 32 27 602 C2 regarding the use of MOS switches leads away from the subject of the present invention, which is based specifically on the use of thyristors. It is also important to keep in mind that in a rectifier of the present type, switches with symmetrical blockability must be used, so that further expense would be encountered by using MOS switches. "Bumpless" switching is also important for use in a motor vehicle. Torque pulses can affect the mechanical connection with the belt, cause belt vibrations, and promote increased slip. This can influence driving comfort and the lifetime of the belt drive. When six thyristors and two identical winding systems are used, there are many different triggering possibilities for the thyristors. FIG. 3 in this connection shows additional recorded characteristics in which various thyristors were triggered. Overall this family of curves fills the intermediate area between the two curves of parallel circuit 301 and series circuit 302. Specifically, curve 303 shows triggering of thyristors 10, 12 and 14 as shown in FIG. 1, curve 304 shows triggering of thyristors 9 and 10 as shown in FIG. 1, and curve 305 shows triggering of thyristor 9. It is clear that cyclic reversal of the thyristors is possible. Other combinations for triggering the thyristors are also possible. During a switching process, a transition is made from one of the curves to another curve. Depending on the loads (consumers) and their power requirements, it is necessary to determine which of the power curves is involved. It also is within the scope of the invention to replace individual thyristors by diodes and thus achieve a permanent series connection of at least a few turns of the two half-windings. As a result, a circuit can be created that requires no control. It is also possible to create a circuit in which the connection is made partially by diodes and partially by triggerable thyristors. Then, once again, there is a transition between two curves when the transistors are triggered.

Figure 4:
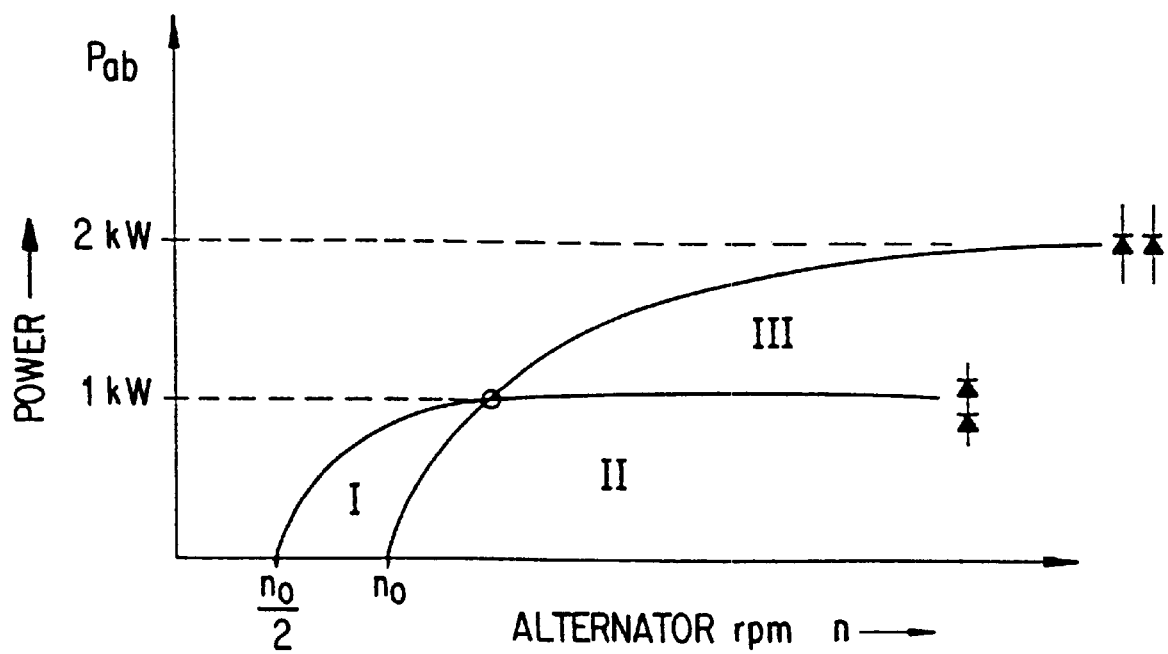
FIG. 4 shows alternator characteristic curves for series and parallel connection at rated load.

FIG. 4 shows the alternator characteristics for serial and parallel connection at rated load (also the alternator boundary curve), for example for an alternator made by Bosch, model number NC 14V73-143A. Both characteristics define three ranges.

If the electrical power to be generated lies in areas I and II, only the series circuit is a possible operating state in area I and only the parallel circuit is possible in area III.

Only area II can be satisfied with both circuits and is therefore not unambiguous. To achieve this decision conflict, a quality criterion is introduced as an additional switching criterion: the quality criterion used is the efficiency η of the system (machine+rectifier). Therefore, whenever possible the parallel circuit should be chosen in area II as well, since here the efficiency of the system is an average of 10% higher. This is due to the familiar conchoids.

Hence, a method should be proposed which performs switching that is as free of bumps as possible, optimally in terms of time (at the earliest possible point in time) from low rpm to higher rpm. With load changes, and beginning at higher rpm values to lower ones, the series circuit should be switched on as late as possible, with this switching of the series circuit likewise being performed as free of bumps as possible.

Switching from one curve to the other is possible almost without bumps at the intersection formed by the two curves with one another during respective excitation. In this case, the synchronous machine is in the same magnetic equilibrium before and after switching, in other words, the same exciting current, the same output current, the same output power, and the same torque acceptance. However there are minor differences due to the scattered reactances between the stator and the rotor, so that the "ideal" switching point actually lies in the vicinity of the intersection. The decline and build-up of magnetic energy during switching in scattered reactance however takes place in microseconds and is not relevant for the technical application here.

First of all a procedure will be described with reference to FIG. 5 in which the switching requirement must be detected, the machine must be guided to the actual intersection of the symmetrical characteristic, and switching must be triggered. This is a "trajectory-oriented method." Any power overshoot or power deficit (undershoot) that may occur is buffered for a short time by the double-layer capacity of the battery.

For reasons of clarity, the output power will be assumed to be constant during the explanation as follows. FIG. 5 shows the two boundary characteristics at rated load. With a decreasing load on the alternator, the intersections at which nearly bump-free switching is possible migrate downward to the right in the characteristic field. All of the intersections together, in a first approximation, as a geometric location form a curve hereinafter referred to as the "switching curve." Starting at $t_1$ the alternator turns on at an rpm $n_1$ and delivers an instantaneous power of $P_1$ (working range I). At point in time $t_4$ the next steady-state end position at $n_4$ is reached and the regulating process in question is ended.

Beginning at starting position $n_1$ the field regulator (of a known design) will attempt to keep the output power constant and, ideally, to reduce excitation. In the characteristic field, one therefore moves horizontally along trajectory 1 as shown in FIG. 1. At point in time $t_2$, in other words at the intersection with the boundary characteristic of the parallel circuit ($i_e = I_{EN}$), switching would be possible for the first time although with a torque bump. The boundary characteristic and the switching curve are then known to the regulation circuit. This can be accomplished for example by an on-line calculation or a table.

In $t_2$, a "trajectory controller" according to the invention is then superimposed on the field regulator which, by its offset, brings the trajectory of $t_2$ in a time-optimal fashion to the "switch curve." At the intersection at time $t_3$, the rectifier is switched to the parallel circuit. At this point the influence of the field regulator is further reduced by the "trajectory controller."

Trajectory $t_1$–$t_4$ is obtained from the beginning to the end position. The short-term difference between the power generated and the power used by the electrical loads (consumers) is absorbed by the double-layer capacity of the battery. This does no harm to the service life of the battery.

As a result of the control delay, in other words the time required to apply the trajectory to the "switch curve", the practically necessary hysteresis develops at the same time, which prevents ongoing switching in case the alternator rpm fluctuates for example by an rpm $n_2$.

Figure 5:
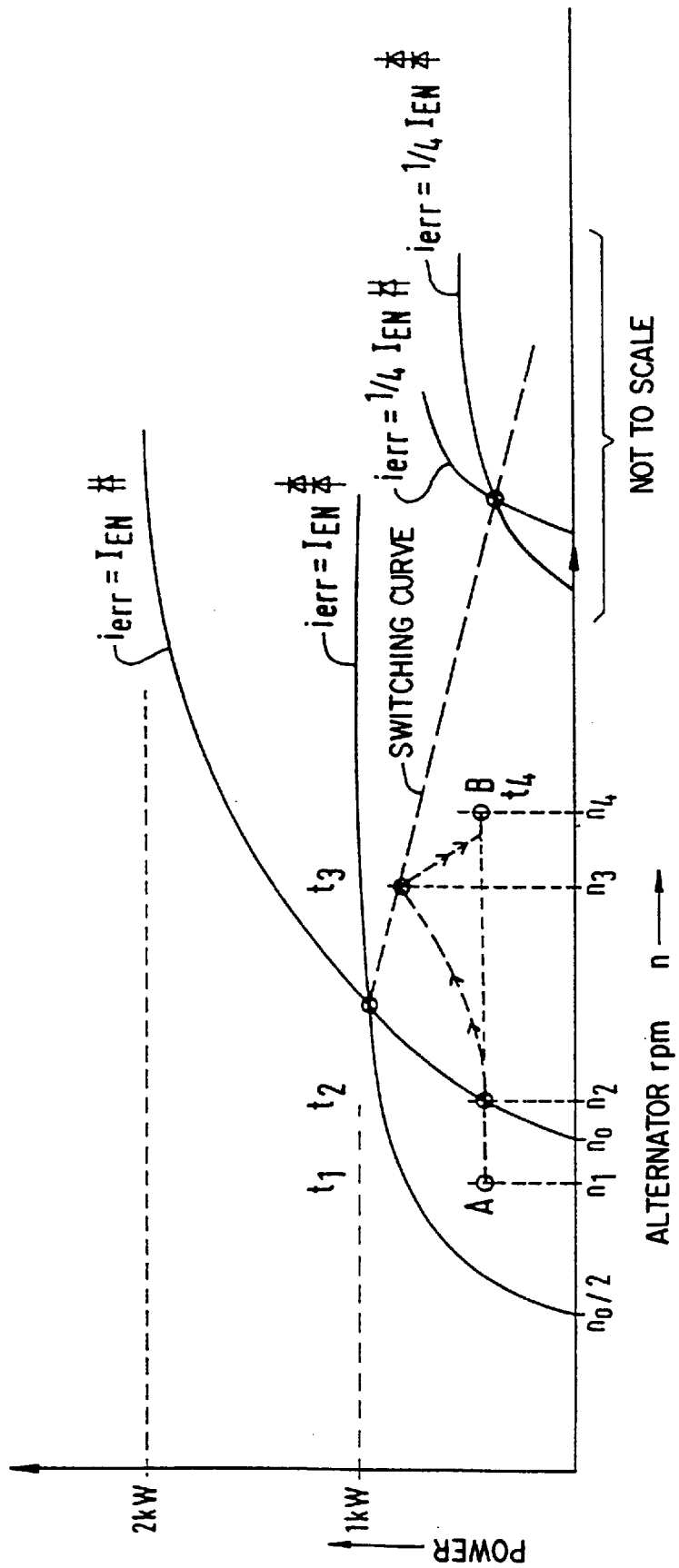
FIG. 5 is a graphical view explaining the procedure used to detect the demand for switching in accordance with the invention.

The method also includes the trivial case when the abscissa in the diagram in FIG. 5 is viewed as an extension of the "switch curve." When the boundary characteristic of the parallel circuit is exceeded, the alternator ceases to be excited, the rectifier is switched as a function of the intersection direction with increasing or decreasing rpm (direction of rpm change), and is again excited. Approximately 400 msec is proposed for this regulating process. The power deficit is likewise covered by the double-layer capacity of the battery without damaging it.

Figure 6:
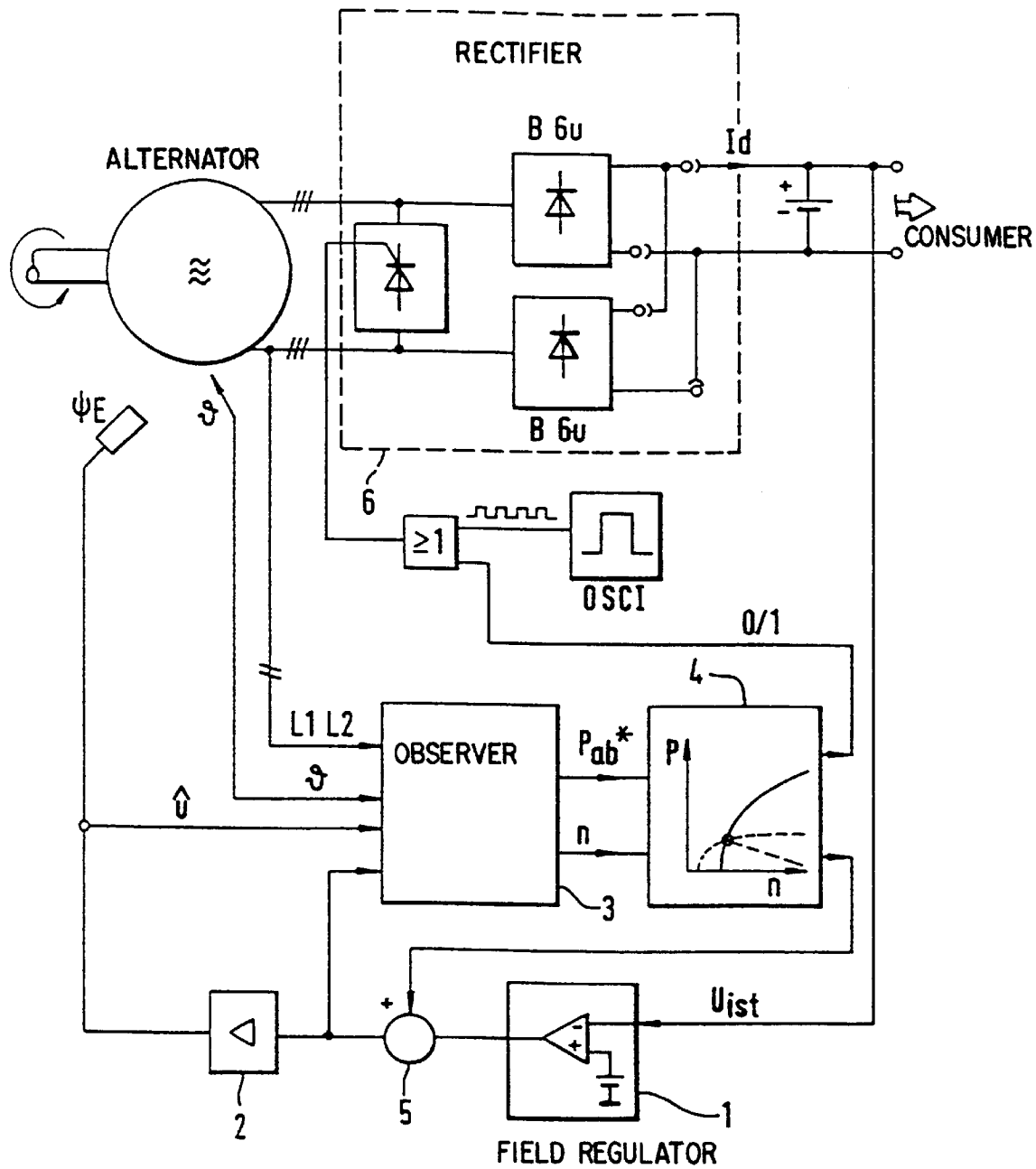
FIG. 6 is a block diagram of a regulating circuit according to the invention.

FIG. 6 shows a block diagram of the regulation process. Field regulator 1 and the field rheostats are designed as a PI regulator and a lowering regulator of known design. In addition there is an observer 3 that estimates the momentary operating point in the characteristic field. The estimate is based on the following calculation:

$$P_{ab}(n+1) = A(R,\theta,\hat{u})P_{ab}(n) + B(R,\theta,\hat{u})\hat{U}(n);$$

$$\tilde{n} = n$$

The rpm signal is generated from the frequency of the phase voltage.

The trajectory control checks to see whether the boundary characteristic has been exceeded. The boundary characteristic can be calculated on-line using neural networks, Lagrangian proximity polynomials or the like, or can also be stored in table form. When an intersection is detected, the trajectory control begins a suitable offset superimposition on the current setting and fits the trajectory in a time-optimal fashion to the switch curve. When it is reached, ignition pulses are either suppressed or allowed to pass through to the thyristors. The same remarks as for the boundary characteristic apply to the representation of the switch lines.

Figure 7:
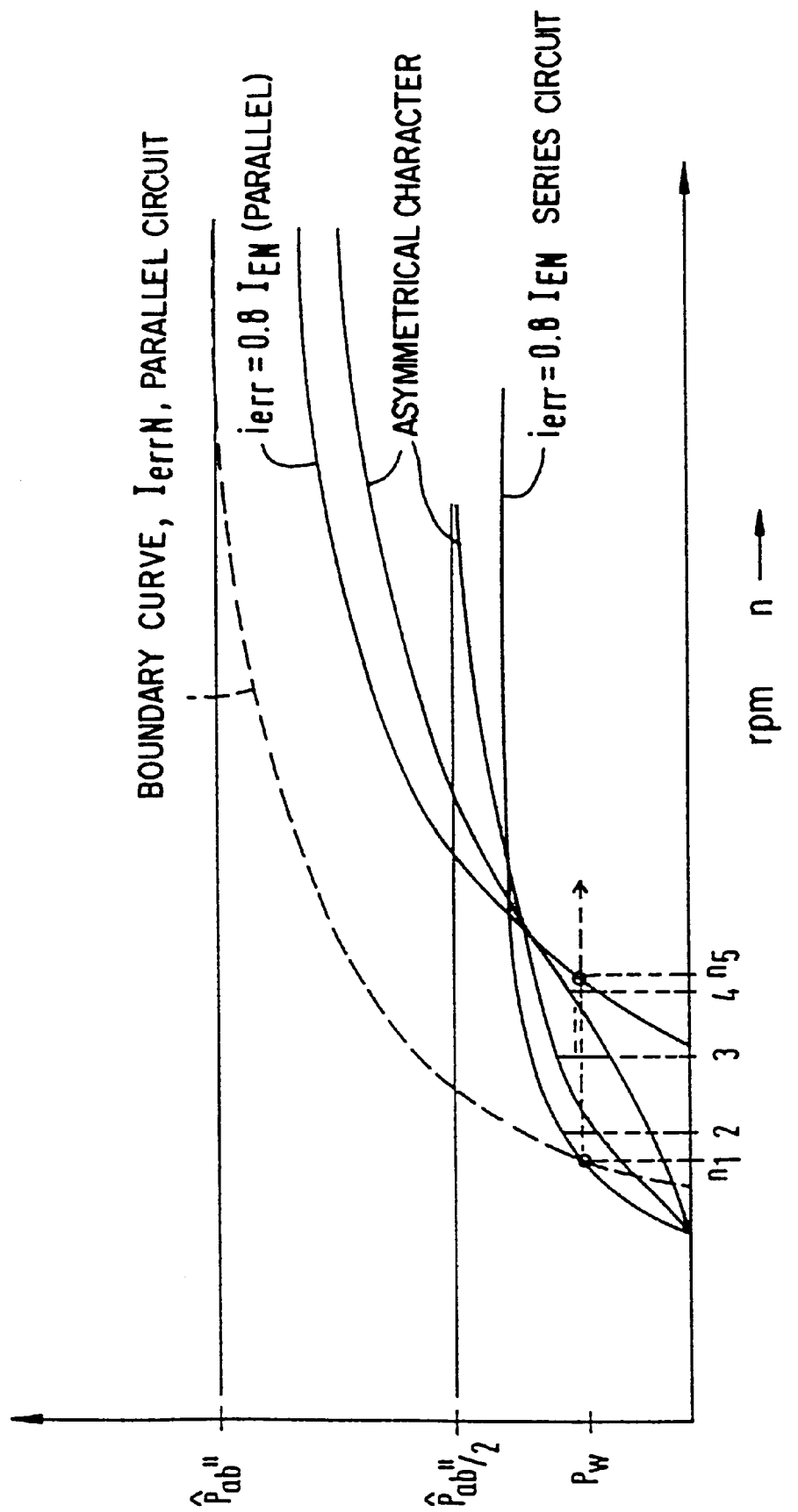
FIG. 7 is a graph explaining the switching method according to the invention.

The description of the switching process refers to the diagram in FIG. 7. FIG. 7 shows the boundary curve of the alternator in a parallel circuit at rated load (dashed line) and the momentary value of the alternator power $P_w(n_1)$, which is already on the boundary curve. The prior history with which the alternator is operated in a series circuit is not relevant. Starting at $n_1$, the rpm must increase further so that a transition is made in as time-optimal fashion as possible to the parallel circuits from the series circuit. Torque bumps should be avoided. At working point $P_w(n_1)$, i.e. the initial position, the alternator is still in the series circuit and is excited with $i_{err} = 0.8 * I_{EN}$. The family of curves for this excitation is likewise shown. The incompleteness of the representation of the family of curves is intended to improve visibility in the diagram in FIG. 7. In contrast to the conditions in FIG. 6, the trajectory controller now generates the complete set of characteristics as a function of the excitation of the alternator.

At the beginning of the regulating process, the working point moves on the characteristic curve of the series circuit with increasing rpm and output power. The field regulator is too inert to achieve the dotted trajectory. When rpm $n_2$ is reached, as soon as the difference between the load (consumer) power $P_w$ and the delivered power $P_{ab}(n_2)$ is of the same order of magnitude as the difference between the load (consumer) power $P_w$ and the next closest characteristic, the latter is switched on. As FIG. 7 shows, the switching algorithm is repeated for all available characteristics until the characteristic of the parallel connection at $n_5$ is reached.

If the rpm does not change so markedly during the regulating process until the parallel characteristic is reached at $n_5$, the trajectory controller can add an offset to the output from the field regulator in order to produce the necessary $\Delta P_s$.

Since the lack of steadiness in the regulating trajectory shows only minor peaks in the regulating trajectory from the beginning to the end point, a relatively gentle transition from the series circuit to the parallel circuit and vice versa is achieved.

It is also possible to replace the thyristors by bidirectional switches and the bridge rectifiers by MOS-FETs. This produces a system that can deliver extremely high moments in a short time so that very high torques result. It is possible with this system, in an arrangement with self-extinguishing valves, to allow a "warm start" of the engine using the alternator. A wear-free start/stop operation can also be achieved. In electric vehicles, the drive used previously can likewise be eliminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit for a motor vehicle alternator having a winding which includes two half-windings having outputs at which rectification of voltages and currents take place, the circuit comprising:

a first rectifier having inputs connected to the outputs of one of said :two half-windings;
   a second rectifier having inputs connected with the outputs of another of said two half-windings, wherein said two half-windings rotate in the same direction and have the same terminal connections; and
   wherein each output of said one half-winding is connectable across gaps of two switchable elements with two outputs of said another half-winding such that said two half-windings are electrically connected in series when said gaps are bridged.

2. A circuit for a motor vehicle alternator having a winding which includes two half-windings having outputs at which rectification of voltages and currents take place, the circuit comprising:

a first rectifier having inputs connected to the outputs of one of said two half-windings;
   a second rectifier having inputs connected with the outputs of another of said two half-windings, wherein said two half-windings rotate in the same direction and have the same terminal connections;
   wherein at least one output of said one half-winding is connectable by a gap of at least one switchable element with a number of outputs of said another half-winding corresponding to the number of switchable elements such that individual windings of said two half-windings are electrically connected in series when the gap is bridged.

3. A circuit for a motor vehicle alternator having a winding which includes two half-windings having outputs at which rectification of voltages and currents take place, the circuit comprising:

a first rectifier having inputs connected to the outputs of one of said two half-windings;
   a second rectifier having inputs connected with the outputs of another of said two half-windings, wherein said two half-windings rotate in the same direction and have the same terminal connections;
   wherein at least one output of said one half-winding is connected through at least one diode with a number of outputs of said another half-winding corresponding to the number of diodes such that individual windings of said two half-windings are permanently electrically connected in series.

4. The circuit according to claim 3, wherein at least one additional output of said one half-winding is connectable by a gap of at least one switchable element with a number of outputs of said another half-winding corresponding to the number of switchable elements such that individual windings of said half-windings are electrically connected in series when the gap is bridged.

5. The circuit according to claim 1, wherein the two switchable elements are thyristors.

6. The circuit according to claim 2, wherein the at least one switchable element is a thyristor.

7. The circuit according to claim 4, wherein the at least one switchable element is a thyristor.

8. A method for controlling a circuit for a motor vehicle alternator having a winding which includes two half-windings having outputs at which rectification of voltages and currents take place, the circuit including a first rectifier having inputs connected to the outputs of one of said two half-windings; a second rectifier having inputs connected with the outputs of another of said two half-windings, wherein said two half-windings rotate in the same direction and have the same terminal connections; and wherein each output of said one half-winding is connectable across gaps of two switchable elements with two outputs of said another half-winding such that said two half-windings are electrically connected in series when said gaps are bridged, the method comprising the acts of:

detecting a certain engine rpm; and
   triggering the two switchable elements when a certain engine rpm value of the vehicle is undershot.

9. A circuit for a motor vehicle alternator having a winding which includes two half-windings having outputs at which rectification of voltages and currents take place, the circuit including a first rectifier having inputs connected to the outputs of one of said two half-windings; a second rectifier having inputs connected with the outputs of another of said two half-windings, wherein said two half-windings rotate in the same direction and have the same terminal connections; and wherein at least one output of said one half-winding is connectable by a gap of at least one switchable element with a number of outputs of said another half-winding corresponding to the number of switchable elements such that individual windings of said two half-windings are electrically connected in series when the gap is bridged, the method comprising the acts of:

detecting a certain engine rpm; and
   triggering the two switchable elements when a certain engine rpm value of the vehicle is undershot.

10. A circuit for a motor vehicle alternator having a winding which includes two half-windings having outputs at which rectification of voltages and currents take place, the circuit including a first rectifier having inputs connected to the outputs of one of said two half-windings; a second rectifier having inputs connected with the outputs of another of said two half-windings, wherein said two half-windings rotate in the same direction and have the same terminal connections; wherein at least one output of said one half-winding is connected through at least one diode with a number of outputs of said another half-winding corresponding to the number of diodes such that individual windings of said two half-windings are permanently electrically connected in series; and wherein at least one additional output of said one half-winding is connectable by a gap of at least one switchable element with a number of outputs of said another half-winding corresponding to the number of switchable elements such that individual windings of said half-windings are electrically connected in series when the gap is bridged, the method comprising the acts of:

detecting a certain engine rpm; and triggering the two switchable elements when a certain engine rpm value of the vehicle is undershot.

11. A method for controlling a circuit for a motor vehicle alternator having a winding which includes two half-windings having outputs at which rectification of voltages and currents take place, the circuit including a first rectifier having inputs connected to the outputs of one of said two half-windings; a second rectifier having inputs connected with the outputs of another of said two half-windings, wherein said two half-windings rotate in the same direction and have the same terminal connections; and wherein each output of said one half-winding is connectable across gape of two switchable elements with two outputs of said another half-winding such that said two half-windings are electrically connected in series when said gaps are bridged, the method comprising the act of:

triggering the two switchable elements in succession and/or only triggering individual ones of the two switchable elements.

12. A method for controlling a circuit for a motor vehicle alternator having a winding which includes two half-windings having outputs at which rectification of voltages and currents take place, the circuit including a first rectifier having inputs connected to the outputs of one of said two half-windings; a second rectifier having inputs connected with the outputs of another of said two half-windings, wherein said two half-windings rotate in the same direction and have the same terminal connections; and wherein at least one output of said one half-winding is connectable by a gap of at least one switchable element with a number of outputs of said another half-winding corresponding to the number of switchable elements such that individual windings of said two half-windings are electrically connected in series when the gap is bridged, the method comprising the act of:

triggering the two switchable elements in succession and/or only triggering individual ones of the two switchable elements.

13. A circuit for a motor vehicle alternator having a winding which includes two half-windings having outputs at which rectification of voltages and currents take place, the circuit including a first rectifier having inputs connected to the outputs of one of said two half-windings; a second rectifier having inputs connected with the outputs of another of said two half-windings, wherein said two half-windings rotate in the same direction and have the same terminal connections; wherein at least one output of said one half-winding is connected through at least one diode with a number of outputs of said another half-winding corresponding to the number of diodes such that individual windings of said two half-windings are permanently electrically connected in series; and wherein at least one additional output of said one half-winding is connectable by a gap of at least one switchable element with a number of outputs of said another half-winding corresponding to the number of switchable elements such that individual windings of said half-windings are electrically connected in series when the gap is bridged, the method comprising the act of:

triggering the two switchable elements in succession and/or only triggering individual ones of the two switchable elements.

14. The method according to claim 7, further comprising the act of triggering the two switchable elements when a certain engine rpm is undershot.

15. The method according to claim 12, further comprising the act of triggering the at least one switchable element when a certain engine rpm is undershot.

16. The method according to claim 13, further comprising the act of triggering the at least one switchable element when a certain engine rpm is undershot.

17. A method for controlling a circuit for a motor vehicle alternator having a winding which includes two half-windings having outputs at which rectification of voltages and currents take place, the circuit including a first rectifier having inputs connected to the outputs of one of said two half-windings;

a second rectifier having inputs connected with the outputs of another of said two half-windings, wherein said two half-windings rotate in the same direction and have the same terminal connections; and further wherein at least one output of said one half-winding is connectable across a gap of at least one switchable element with a number of outputs of said another half-winding corresponding to the number of switchable elements such that individual windings of said two half-windings are electrically connected in series when the gap is bridged, the method comprising the act of:

activating and/or deactivating the switchable elements only when the three-phase alternator is operated under conditions that the alternator is in the same magnetic equilibrium after the activation/deactivation of the switching element as before the activation/deactivation of the switching element.

18. The method according to claim 17, further comprising the act of controlling a power of the three-phase alternator such that the alternator is operated to be in the same magnetic equilibrium before and after the activation/deactivation of the switching element.

* * * * *